United States Patent
Mueller

(10) Patent No.: US 7,685,167 B2
(45) Date of Patent: Mar. 23, 2010

(54) CONFIGURATION MANAGEMENT DATABASE REFERENCE INSTANCE

(75) Inventor: Doug Mueller, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 307 days.

(21) Appl. No.: 11/669,005

(22) Filed: Jan. 30, 2007

(65) Prior Publication Data

US 2008/0183724 A1    Jul. 31, 2008

(51) Int. Cl.
*G05F 12/00* (2006.01)
(52) U.S. Cl. .................................... 707/200; 707/100
(58) Field of Classification Search ......... 707/100–102, 707/103 R, 200–201
See application file for complete search history.

(56) References Cited

U.S. PATENT DOCUMENTS

| | | | | |
|---|---|---|---|---|
| 5,838,965 | A * | 11/1998 | Kavanagh et al. | 707/103 R |
| 6,085,198 | A * | 7/2000 | Skinner et al. | 707/103 R |
| 6,393,481 | B1 * | 5/2002 | Deo et al. | 709/224 |
| 6,442,620 | B1 * | 8/2002 | Thatte et al. | 719/316 |
| 7,366,989 | B2 * | 4/2008 | Naik et al. | 715/736 |
| 2004/0085345 | A1 * | 5/2004 | Galou et al. | 345/734 |
| 2004/0107277 | A1 * | 6/2004 | Levesque et al. | 709/223 |
| 2004/0193388 | A1 * | 9/2004 | Outhred et al. | 703/1 |
| 2005/0021713 | A1 * | 1/2005 | Dugan et al. | 709/223 |
| 2005/0149907 | A1 * | 7/2005 | Seitz et al. | 717/108 |
| 2005/0267913 | A1 * | 12/2005 | Stienhans et al. | 707/200 |
| 2006/0092861 | A1 * | 5/2006 | Corday et al. | 370/256 |
| 2006/0129880 | A1 * | 6/2006 | Arcese et al. | 714/11 |
| 2006/0203849 | A1 * | 9/2006 | Bonar et al. | 370/473 |
| 2006/0271341 | A1 * | 11/2006 | Brown et al. | 703/1 |
| 2007/0047017 | A1 * | 3/2007 | Ando et al. | 358/448 |

* cited by examiner

*Primary Examiner*—Wilson Lee
(74) *Attorney, Agent, or Firm*—Wong, Cabello, Lutsch, Rutherford & Brucculeri, L.L.P.

(57) ABSTRACT

A reference instance for use in a configuration management system is a configuration item that may be associated with a number of assets, all of which share a common set of attributes. The use of reference instances permits a single configuration item to identify a potentially large number of assets. This may be particularly useful for identifying and tracking low-priority assets where the detail or amount of information needed to effectively track and manage the asset is relatively small. Use of reference instance configuration items allows an organization to identify and manage virtually all of their assets without the cost and effort of creating large numbers of substantially identical configuration items.

14 Claims, 2 Drawing Sheets

CONFIGURATION MANAGEMENT DATABASE REFERENCE INSTANCE

BACKGROUND

It is common to use a configuration management database (CMDB) to store information about an organization's assets and the relationships between different assets. In this context, information about an asset is captured and stored in a software object referred to as configuration item (CI). As used herein, a CI can represent any conceivable resource or component including software, hardware, documentation, facilities and personnel, as well as any combination of these. The process of configuration management seeks to specify, control and track an organization's assets (including changes made to them) in a comprehensive and systematic fashion through the use of configuration items.

For configuration management purposes, an instance of a CI is created and stored in a CMDB for each asset that an organization wishes to manage. It will be appreciated that a single "asset" may include a large number of individually tracked components, each of which may have their own corresponding CI instance. For example, a single desktop computer system may be associated with more than 500 CIs (e.g., one each for the keyboard, mouse, display screen, hard disk, network adapter, graphics card and installed software, including all patches and updates). At this level of granularity, to identify and track each asset, for even a relatively small organization, can require many millions of CIs. Large organizations can require hundreds of millions of CIs to represent their environment. The effort to create and manage this many CIs (in terms of storage and human effort) can be very large.

In the prior art, the problem of tracking this many CIs is avoided by an organization choosing to simply not track items that are of minor interest (e.g., the number of file cabinets it owns or word processing applications that it has purchased and installed). Unfortunately, this can lead to an incomplete accounting of an organization's assets. Thus, it would be beneficial to provide a mechanism that allows an organization to track all of their assets without incurring the storage and management overhead of creating individual configuration item instances for each unique asset to be tracked.

SUMMARY

In one embodiment the invention provides a method to identify a plurality of assets through a single configuration item in a configuration management database. The method includes instantiating a configuration item object having a plurality of attributes and a flag attribute, setting one or more of the plurality of attributes to identify an asset (e.g., a computer system components, computer software and non-computer related objects), setting the flag attribute to identify the configuration item object as a reference instance configuration item object, associating a plurality of assets identified by the set plurality of attributes with the reference instance configuration item object, and storing the reference instance configuration item object in a configuration management data store. An executable program to implement the method may be stored in any media that is readable and executable by a programmable control device. In another embodiment, the invention provides a configuration item entity stored in a computer readable medium for use in a configuration management database. The configuration item entity includes a first plurality of attributes for identifying characteristics of an asset (e.g., computer network equipment, software applications and computer system components), and a reference instance attribute that, when set, identifies the configuration item as a reference instance configuration item—the reference instance configuration item for identifying a plurality of assets as characterized by the first plurality of attributes.

DETAILED DESCRIPTION

The following description is presented to enable any person skilled in the art to make and use the invention as claimed and is provided in the context of the particular configuration management examples discussed below, variations of which will be readily apparent to those skilled in the art. Accordingly, the claims appended hereto are not intended to be limited by the disclosed embodiments, but are to be accorded their widest scope consistent with the principles and features disclosed herein.

This application claims subject matter that is related to the subject matter described in U.S. patent application Ser. Nos. 11/204,189 entitled "Resource Reconciliation," filed 15 Aug. 2005; 11/538,393 entitled "Database Application Federation," filed 3 Oct. 2006; and 11/538,377 entitled "Overlay Dataset," filed 3 Oct. 2006, all of which are hereby incorporated by reference.

From an asset management perspective, there are many assets that only need to be tracked at a superficial level. For example, it may be sufficient to know how many of a given asset an organization owns. Assets of this type include, but are not limited to, standard hardware assets such as computer displays, pointer devices, keyboards, network adapter cards, small printers, file cabinets and bookshelves. Other types of assets can require substantially more information to track and manage. Assets of this type include, but are not limited to, certain types of physical equipment (e.g., network switches, storage systems, and the like) and certain types of software applications (typically complex applications such as database management systems and computer aided design tools).

In accordance with the invention, a special type of CI—a reference instance CI—is created that may be used to identify a plurality of similar environmental objects. For example, if an organization has 10,000 copies of word processor application A, but does not need or want to track the details of each instance of the application, a reference instance CI may be created and each of the 10,000 copies associated with it. In this manner, the organization is able to account for each copy of the application (desirable from an asset tracking point of view) and can eliminate 9,999 duplicate CIs over prior art approaches (desirable from a data management point of view).

Figure 1:
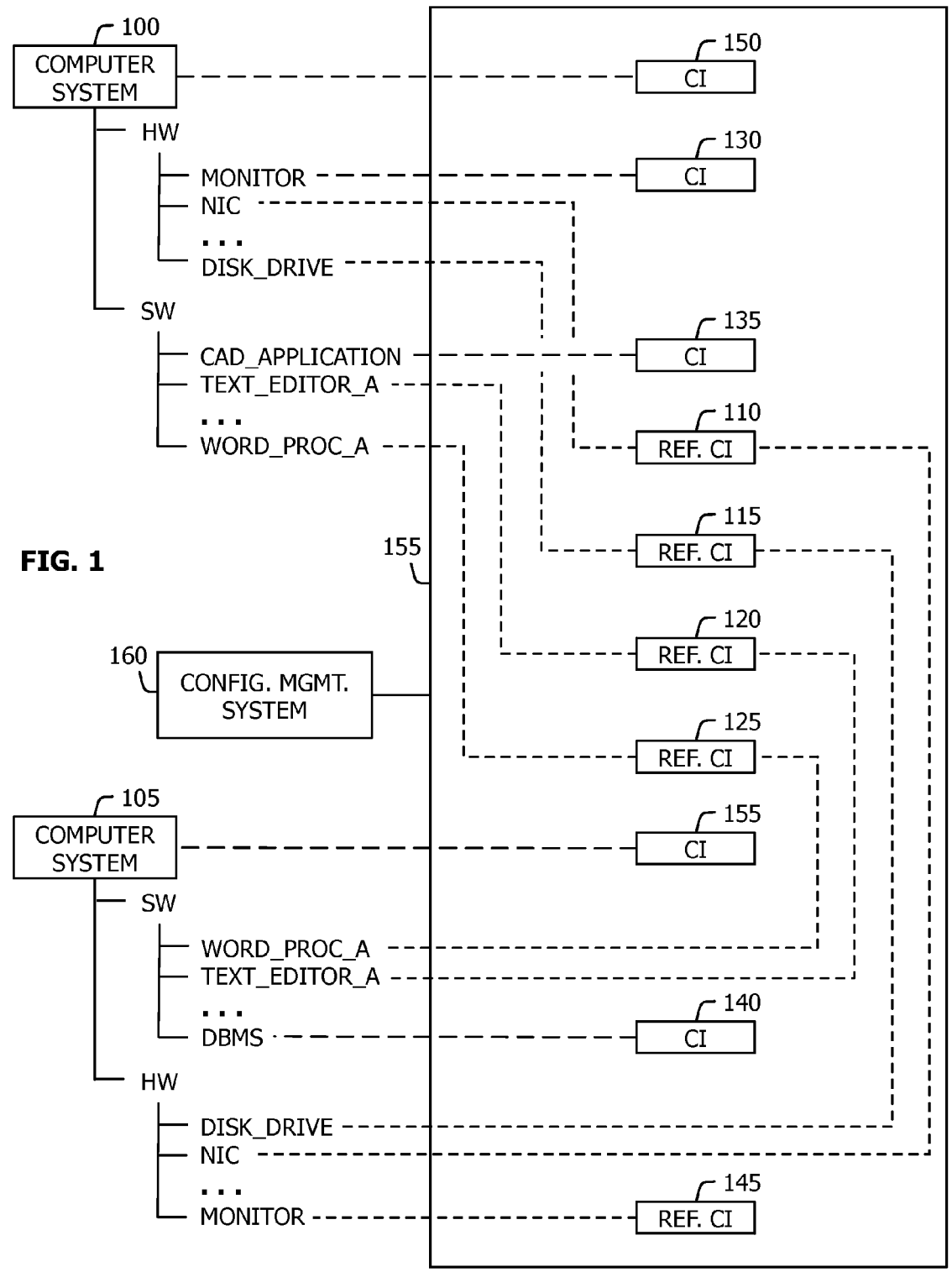
FIG. 1 shows the use of reference instance configuration items in accordance with one embodiment of the invention.

Use of reference instance configuration items in accordance with the invention may be clearly demonstrated by reference to FIG. 1. As shown, computer systems 100 and 105 comprise the following common components: network interface card or NIC (identified via reference instance CI 110), disk drive (identified via reference instance CI 115), text editor A (identified via reference instance CI 120) and word processor A (identified via reference instance CI 125). Presumably, additional computer systems having the same common components are linked to these same reference instance CIs. Computer system 100 also includes a unique monitor (identified via CI 130) and a unique computer aided design application (identified via CI 135). In like manner, computer system 105 includes a unique database management system application (identified via CI 140) but, unlike computer system 100, utilizes a common monitor (identified via reference instance CI 145). (Additional computer systems utilizing monitors represented by reference instance CI 145 would, presumably, also be associated with reference instance CI 145). Finally, as both computer systems 100 and 105 are to be identified and tracked on an individual basis, each is associated with its own CI (150 and 155, respectively). As used herein, the term "unique" simply means that the asset is identified by, and associated with, a single CI.

As shown in FIG. 1, dashed lines represent the logical association between each configuration item instance and its related asset. The association between reference instance CIs and common assets is denoted via short dashes. The association between prior art type CIs and assets is denoted via long dashes. Also as shown, all CIs 110-150 are retained in configuration management data store or database 155 which is utilized by a configuration management system 160. While configuration management data store 155 is shown as a single database entity, one of ordinary skill in the art will recognize that data store 155 may, in fact, comprise a number of different elements (e.g., a distributed database and/or a federated database).

Accordingly, within a configuration management data store each standard CI instance is associated with (e.g., represents) a single asset in the environment. In contrast, each reference instance CI in accordance with the invention represents two or more assets in the environment. Consider a corporate environment in which there are 10,000 desktop or personal computer systems. If each system includes 200 items or assets that may be accounted for through reference instances CIs (e.g., common hardware and software of the types illustrated in FIG. 1), a total of 2 million assets may be accounted for through 200 reference instance CIs! The use of reference instance CIs in accordance with the invention permits such an organization to identify and track each and every such asset while avoiding having to create, store and manage 4,999,980 CIs.

In one illustrative embodiment, reference instance configuration items are being implemented in the BMC Atrium™ CMDB product—a configuration management database product. (BMC ATRIUM is a trademark of BMC Software, Inc.) The BMC Atrium CMDB product utilizes an object-oriented model on a relational database whose elements are defined in terms of a series of objects organized in accordance with a common data model. Referring to Table 1, in one embodiment a reference instance configuration item may be defined by adding a single attribute (the "ReferenceInstance" attribute) to the configuration item object definition. This change permits the configuration management system to identify stored instances as either a "regular" CI (having a one-to-one correspondence with an asset) or a reference instance CI (having a one-to-many reference to corresponding assets).

TABLE 1

Illustrative Reference Instance Configuration Item Object

| Attribute | Type | Comment |
|---|---|---|
| InstanceId | character | Unique identifier of the instance. |
| ReferenceInstance | flag | Identifies the configuration item instance as a reference instance configuration item. For example, if this attribute equals "1" the instance is a reference instance, otherwise the instance is a standard configuration item instance. |
| AccountID | character | Identifies the account to which the instance belongs. Accounts can represent customers, organizations, departments, or other parties. |
| Description | character | Textual description of the instance. |
| ManufacturerName | character | Organization that produced the asset represented by the instance. |
| Model | character | Name by which the asset represented by the instance is generally known. |
| SerialNumber | character | Manufacturer-allocated number used to identify the physical asset represented by the instance. |
| VersionNumber | character | Version number of the physical asset represented by the instance. |
| Supported | flag | Attribute that specifies whether technical support is provided for this class. |

Not all configuration item object attributes are shown.

By way of example, if a reference instance CI were to be used to track a word processing application, the configuration item created for this task would have its ReferenceInstance attribute set identify it as a reference instance. In addition, the Description, ManufacturerName, VersionNumber and Supported fields may be set as appropriate. In such an embodiment, each version of the word processing application could have its own reference instance CI. Similarly, if a hardware component (e.g., magnetic storage disks) were to be tracked using reference instance CIs, the configuration item created for this task would have its ReferenceInstance attribute set identify it as a reference instance. In addition, the Description, ManufacturerName, Model, SerialNumber and Supported fields may be set as appropriate.

Figure 2A:
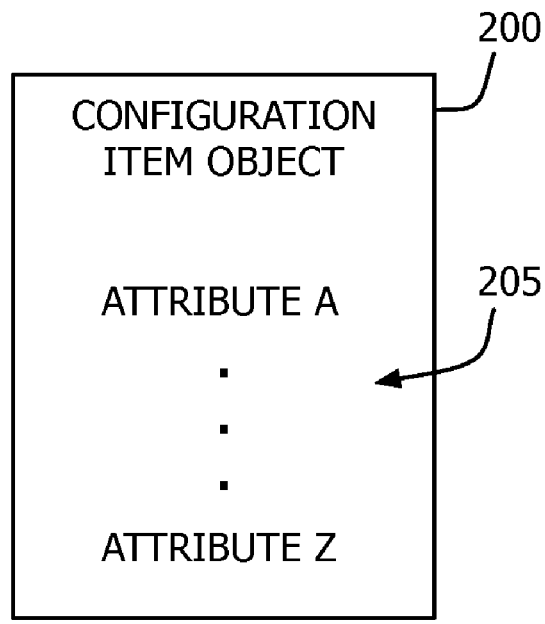
FIGS. 2A and 2B show, in block diagram form, compares a prior art configuration item object (2A) with a configuration item object in accordance with one embodiment of the invention (2B).
Figure 2B:
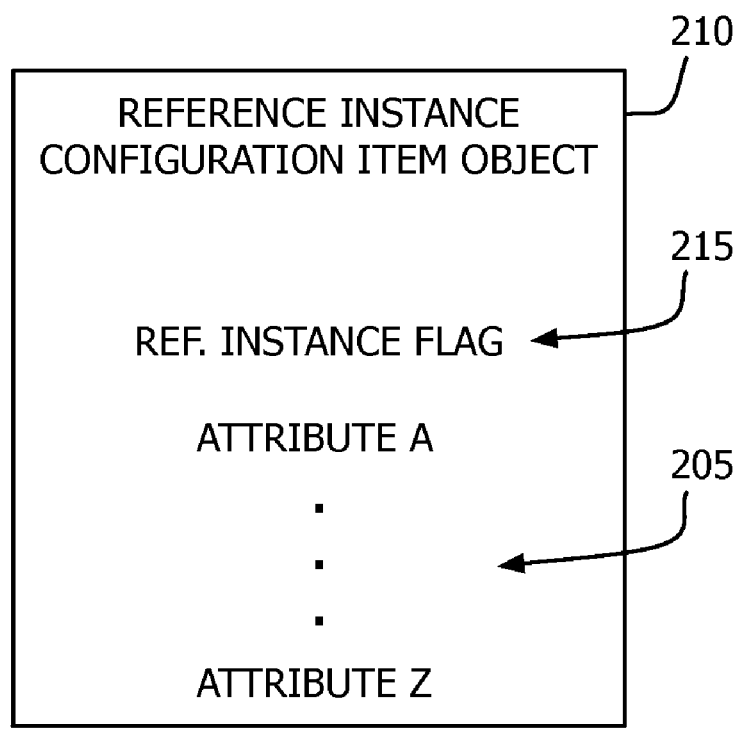

The structural difference between a prior art configuration item object and a configuration item object that permits the instantiation of a reference instance configuration item is shown diagrammatically in FIGS. 2A and 2B. Prior art CI 200 includes attributes 205 that are used to capture information related to the specific asset being represented. Configuration item object 210 in accordance with one embodiment of the invention includes prior art attributes 205 and, in addition, reference instance flag 215. As noted in Table 1, reference instance flag 215 is used to identify the object (actually, an instance of the object) stored within a configuration management data store (e.g., a CMDB) as a reference instance.

In the interest of clarity, not all features of an actual implementation have been described in this specification. It will of course be appreciated that in the development of any such actual implementation (as in any software development project), numerous programming decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for one skill in the art of configuration management system program development. For instance, an illustrative reference instance CI has been described within the context of a relational database using an object-oriented data model. The reference instance concept is equally applicable to a completely relational database implementation, a completely object-oriented database implementation, a completely hierarchical database implementation or any combination of these approaches. Furthermore, while the examples presented herein address type or ownership associations between components and CIs, one of ordinary skill in the art will understand that CI's (including reference CIs) also support the concept of "relationships." Thus, reference CIs in accordance with the invention are equally applicable to establishing associations via relationships.

For example, while an illustrative reference instance CI object has been described as a "modified" version of a standard or prior art CI object, this is not necessary. A reference instance CI in accordance with the invention could be implemented as a totally separate type of object or entity within a configuration management data store. Similarly, the illustrated reference instance CI was described as including a reference instance "flag" to denote it (when set) as being a reference instance CI. While this terminology suggests a binary or Boolean type attribute, this is not necessary. Virtually any type of attribute may be used (e.g., integer, Boolean, character).

In addition, reference instance configuration items in accordance with the invention may be embodied in software objects or modules that are manipulated by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions and reference instance configuration item definitions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A configuration management database method executable by a programmable control device, the method comprising:
   instantiating, by a programmable control device, a configuration item object, the configuration item object having a plurality of attributes and a flag attribute;
   setting one or more of the plurality of attributes to identify an asset;
   setting the flag attribute to identify the configuration item object as a reference instance configuration item object;
   associating a plurality of assets with the reference instance configuration item object; and
   storing the reference instance configuration item object in a configuration management data store;
   wherein the reference instance configuration item object represents a plurality of assets, one asset for each of the associated plurality of assets.

2. The method of claim 1, wherein the flag attribute comprises a Boolean attribute.

3. The method of claim 1, wherein the asset comprises an electronic device.

4. The method of claim 3, wherein the electronic device comprises a digital storage device.

5. The method of claim 3, wherein the electronic device comprises a computer display.

6. The method of claim 1, wherein the asset comprises a software entity.

7. The method of claim 6, wherein the software entity comprises a software application.

8. The method of claim 1, wherein the software entity comprises a software update module.

9. The method of claim 1, wherein the asset comprises a non-computer related entity.

10. The method of claim 1, wherein the configuration management data store comprises a relational database.

11. The method of claim 1, wherein the configuration management data store comprises an object oriented database.

12. The method of claim 1, wherein the configuration management data store comprises a hierarchical database.

13. A program storage device, readable by a programmable control device, comprising instructions stored on the program storage device for causing the programmable control device to perform acts in accordance with claim 1.

14. A computer network executing a method to manage assets with a configuration management database, the computer network comprising:
   one or more non-volatile storage devices configured to store configuration item objects, each of the one or more non-volatile storage devices communicatively coupled to a network; and
   one or more computer systems communicatively coupled to the network, at least one of the one or more computer systems programmed to perform at least a portion of the method of claim 1 wherein the method of claim 1 is performed collectively by the one or more computer systems communicatively coupled to the network.

* * * * *